US009080366B2

(12) United States Patent
Schiegel

(10) Patent No.: US 9,080,366 B2
(45) Date of Patent: Jul. 14, 2015

(54) DRIVE CONFIGURATION FOR THE MOTORIZED DISPLACEMENT OF A DISPLACEMENT ELEMENT OF A MOTOR VEHICLE

(75) Inventor: Stefan Schiegel, Staffelstein (DE)

(73) Assignee: BROSE FAHRZEUGTEILE GMBH & CO. KG, HALLSTADT, Hallstadt (DE)

( * ) Notice: Subject to any disclaimer, the term of this patent is extended or adjusted under 35 U.S.C. 154(b) by 458 days.

(21) Appl. No.: 13/145,825

(22) PCT Filed: Jan. 21, 2010

(86) PCT No.: PCT/EP2010/000336
§ 371 (c)(1),
(2), (4) Date: Sep. 30, 2011

(87) PCT Pub. No.: WO2010/083999
PCT Pub. Date: Jul. 29, 2010

(65) Prior Publication Data
US 2012/0013143 A1 Jan. 19, 2012

(30) Foreign Application Priority Data
Jan. 23, 2009 (DE) ..................... 20 2009 000 907 U

(51) Int. Cl.
*H02P 7/00* (2006.01)
*H02K 7/20* (2006.01)
(Continued)

(52) U.S. Cl.
CPC ................. *E05F 15/10* (2013.01); *E05F 15/40* (2015.01); *E05F 15/603* (2015.01);
(Continued)

(58) Field of Classification Search
None
See application file for complete search history.

(56) References Cited

U.S. PATENT DOCUMENTS

| | | | | |
|---|---|---|---|---|
| 3,757,472 | A * | 9/1973 | Rogakos | 49/40 |
| 4,156,523 | A * | 5/1979 | Bauer | 267/120 |
| 6,182,952 | B1 * | 2/2001 | Gutierrez | 267/64.11 |
| 8,373,550 | B2 * | 2/2013 | McKee et al. | 340/426.28 |
| 2005/0277512 | A1 * | 12/2005 | Gueler et al. | 475/317 |

(Continued)

FOREIGN PATENT DOCUMENTS

| | | |
|---|---|---|
| DE | 19834823 | 7/1999 |
| DE | 102004016881 | 11/2005 |

(Continued)

OTHER PUBLICATIONS

German (DE) Search Report from German Patent Application 202009000907.6, corresponding to U.S. Appl. No. 13/145,825, mailed Jan. 29, 2010, pp. 1-4.

(Continued)

*Primary Examiner* — Eduardo Colon Santana
*Assistant Examiner* — Devon Joseph
(74) *Attorney, Agent, or Firm* — Pauly, DeVries Smith & Deffner, LLC

(57) ABSTRACT

The invention relates to a drive configuration for the motorized displacement of a displacement element of a motor vehicle, at least one drive having an electrical drive motor, in particular a DC motor, and a drive controller, which is associated with the drive and connected to a supply voltage $U_V$, being provided, the drive not being designed as self-locking, so that in the case of a non-motorized displacement of the displacement element, the drive motor operates as a generator and generates a generator voltage $U_G$. It is proposed that the drive controller is equipped with an overvoltage protector, which can be triggered by exceeding a limiting supply voltage $U_V$, and that the configuration is further made so that the overvoltage protector can additionally be triggered by a non-motorized displacement of the displacement element if a limiting generator voltage $U_G$ is exceeded.

19 Claims, 4 Drawing Sheets

(51) Int. Cl.

| | |
|---|---|
| ***E05F 15/10*** | (2006.01) |
| ***E05F 15/40*** | (2015.01) |
| ***E05F 15/603*** | (2015.01) |
| ***E05F 15/622*** | (2015.01) |

(52) U.S. Cl.

CPC ........ *E05F 15/622* (2015.01); *E05Y 2201/434* (2013.01); *E05Y 2201/456* (2013.01); *E05Y 2400/302* (2013.01); *E05Y 2400/502* (2013.01); *E05Y 2400/506* (2013.01); *E05Y 2400/512* (2013.01); *E05Y 2400/514* (2013.01); *E05Y 2400/532* (2013.01); *E05Y 2800/112* (2013.01); *E05Y 2800/21* (2013.01); *E05Y 2800/232* (2013.01); *E05Y 2800/236* (2013.01); *E05Y 2800/238* (2013.01); *E05Y 2800/242* (2013.01); *E05Y 2800/404* (2013.01); *E05Y 2800/73* (2013.01); *E05Y 2900/546* (2013.01)

(56) References Cited

U.S. PATENT DOCUMENTS

| | | | | |
|---|---|---|---|---|
| 2009/0120003 | A1* | 5/2009 | Bochen et al. | 49/340 |
| 2011/0271595 | A1* | 11/2011 | Eggeling et al. | 49/358 |

FOREIGN PATENT DOCUMENTS

| | | | |
|---|---|---|---|
| DE | 102004052590 | | 5/2006 |
| DE | 202005007155 | | 10/2006 |
| DE | 102007001068 | | 7/2008 |
| EP | 596472 | A2 * | 5/1994 |
| EP | 2308737 | A1 * | 4/2011 |
| GB | 510561 | | 8/1939 |

OTHER PUBLICATIONS

PCT International Search Report and Written Opinion from International Application No. PCT/EP2010/000336, corresponding to U.S. Appl. No. 13/145,825, mailed Jan. 21, 2010, pp. 1-12.

* cited by examiner

DRIVE CONFIGURATION FOR THE MOTORIZED DISPLACEMENT OF A DISPLACEMENT ELEMENT OF A MOTOR VEHICLE

CROSS REFERENCE TO RELATED APPLICATIONS

This application is a national stage application under 35 U.S.C. 371 of International Patent Application Serial No. PCT/EP2010/000336, entitled "DRIVE CONFIGURATION FOR THE MOTORIZED DISPLACEMENT OF A DISPLACEMENT ELEMENT OF A MOTOR VEHICLE," filed Jan. 21, 2010, which claims priority from German Patent Application No. 20 2009 000 907.6, filed Jan. 23, 2009, the disclosures of which are incorporated herein by reference.

FIELD OF THE INVENTION

The invention relates to a drive configuration for the motorized displacement of a displacement element in a motor vehicle and a displacement element configuration of a motor vehicle.

BACKGROUND OF THE INVENTION

The term "displacement element" is to be understood comprehensively in the present case. It includes hatchbacks, trunk lids, engine hoods, doors, in particular side doors, cargo space floors, or the like of a motor vehicle.

However, the drive configuration under discussion is primarily used in hatchbacks and side doors in motor vehicles. It is used for the motorized displacement of the respective displacement element in the closing direction and in the opening direction. It is typically important that the drive configuration also permits manual displacement operation in addition to the motorized displacement operation. The manual displacement operation is significant in particular in case of emergency, for example, in the event of a crash or power failure.

The known drive configuration (DE 20 2005 007 155 U1), from which the invention proceeds, is associated with a hatchback. The drive configuration is equipped with two spindle drives, which each have, in a compact module, a drive motor, an intermediate gearing having clutch, and a spindle-spindle nut gearing. A spring configuration is provided in the respective module, which counteracts the weight force of the associated hatchback. The known drive configuration further has a drive controller, which is used to activate the two drives, in particular the two drive motors. The drives are not designed as self-locking, so that manual operation is implemented in a simple way.

Hatchbacks of significant size and/or significant weight can be adjusted by motor using the known drive configuration. This opens up new degrees of freedom in the design of such hatchbacks. However, an increased risk it event of a failure of drive components is also connected to the increase of the weight.

SUMMARY OF THE INVENTION

The invention is based on the problem of implementing and refining the known drive configuration such that the operational safety is increased using simple means. The above problem is solved in the case of a drive configuration for the motorized displacement of a displacement element of a motor vehicle, at least one drive having an electrical drive motor, in particular a DC motor, and a drive controller, which is associated with the drive and connected to a supply voltage $U_V$, being provided, the drive not being designed as self-locking, so that in the case of a non-motorized displacement of the displacement element, the drive motor operates as a generator and generates a generator voltage $U_G$, wherein the drive controller is equipped with an overvoltage protector, which can be triggered by exceeding a limiting supply voltage $U_V$, the configuration is further made so that the overvoltage protector can additionally be triggered by a non-motorized displacement of the displacement element if a limiting generator voltage $U_G$ is exceeded, wherein two drives are provided, and the drive controller for activating the drive motors of the drives has an H-bridge circuit with overvoltage protector in each case, and the respective corresponding supply terminals of the H-bridge circuits are interconnected.

The fundamental consideration that an apparatus for overvoltage protection, which is only referred to hereinafter as an "overvoltage protector", can, with suitable design, be used for the purpose of increasing the operational safety of the drive configuration under discussion is essential.

The above overvoltage protector is primarily used to protect the drive controller and the motor from voltage spikes in the supply voltage. Correspondingly, the overvoltage protector is triggered if a limiting supply voltage applied to the supply terminals is exceeded. This triggering is typically connected to a corresponding switching procedure.

The solution according to the proposal makes use of the fact that the drive motor operates as a generator and generates a generator voltage during a non-motorized displacement, in particular during a displacement of the displacement element which is manual, caused by spring force, or caused by gravity. The configuration is made in such a way that the overvoltage protector can also be triggered by such a non-motorized displacement of the displacement element if a limiting generator voltage is exceeded.

Depending on the application, various switching procedures may accompany the triggering of the overvoltage protector. In one embodiment, the overvoltage protector electrically couples the terminals of the drive motor to one another, in particular short-circuits them, in the triggered state, whereby the drive motor is braked.

In particular in the case of the last-mentioned variant, it is advantageous that the overvoltage protector is only triggered if the non-motorized displacement of the displacement element occurs above the normal operational displacement speed.

In one embodiment, the drive controller is equipped with an H-bridge circuit, which has two integrated half-bridge modules having overvoltage protectors. The fact that a plurality of different standard half-bridge modules can be used is advantageous for this purpose, so that a design of the drive controller which is adapted to the respective application, in particular to the respective normal operational displacement speed, is possible. In a more particular embodiment, the two half-bridges of the H-bridge circuit are each designed as an integrated half-bridge module, and both half-bridge modules are each preferably equipped with a separate overvoltage protector, and preferably the two half-bridge modules each have one logic unit for activating the low-side switch and the high-side switch, and furthermore, the overvoltage protector of the two half-bridge modules preferably has a detection unit in each case, which is connected to the logic unit, for detecting if the supply voltage $U_V$ exceeds the limiting supply voltage.

According to a further teaching, which also has independent significance, the above problem is solved in the case of a displacement element in particular a hatchback, and having a drive configuration for the motorized displacement of the displacement element.

The displacement element configuration according to the proposal is equipped with a displacement element, in particular a hatchback, of a motor vehicle and with a drive configuration according to the proposal for the motorized displacement of the displacement element. Reference can be made to all statements relevant to the drive configuration for the explanation of this further teaching.

BRIEF DESCRIPTION OF THE FIGURES

The invention is explained in greater detail hereinafter on the basis of a drawing, which merely shows one exemplary embodiment. In the drawing.

DETAILED DESCRIPTION

Figure 1:
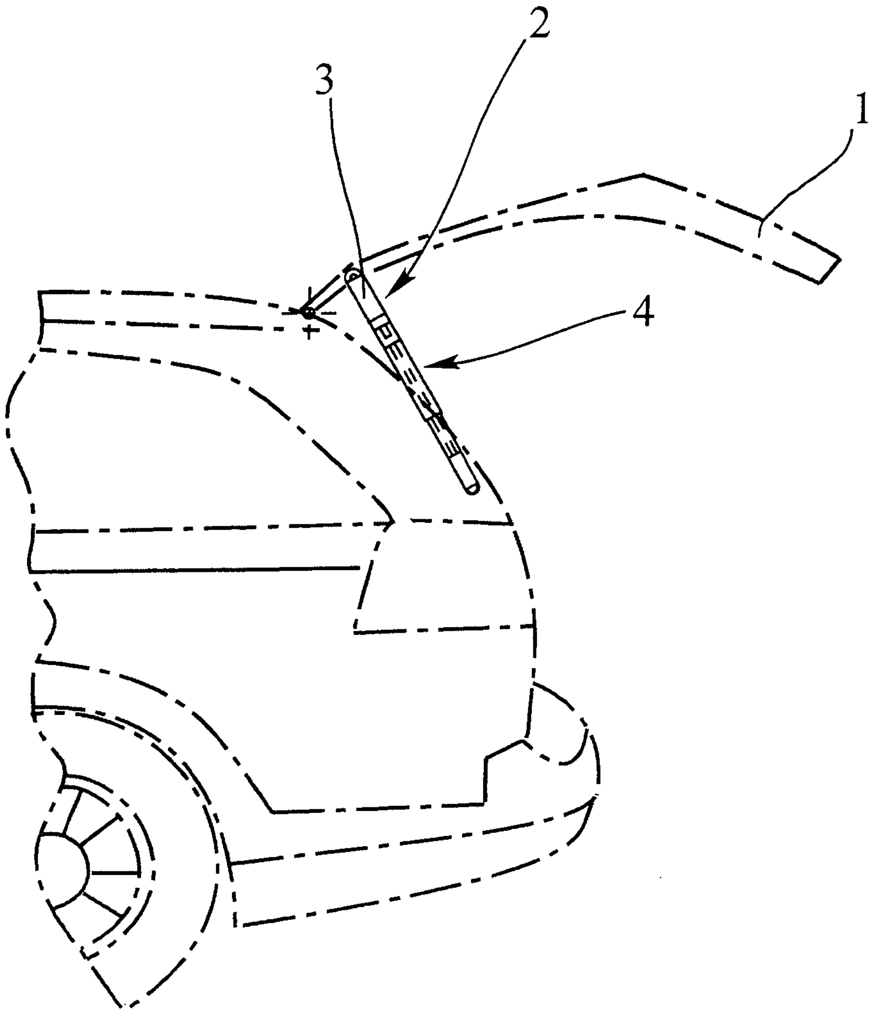
FIG. 1 shows the rear of a motor vehicle in a side view having a hatchback and a drive configuration according to the proposal for the motorized displacement of the hatchback.
Figure 2:
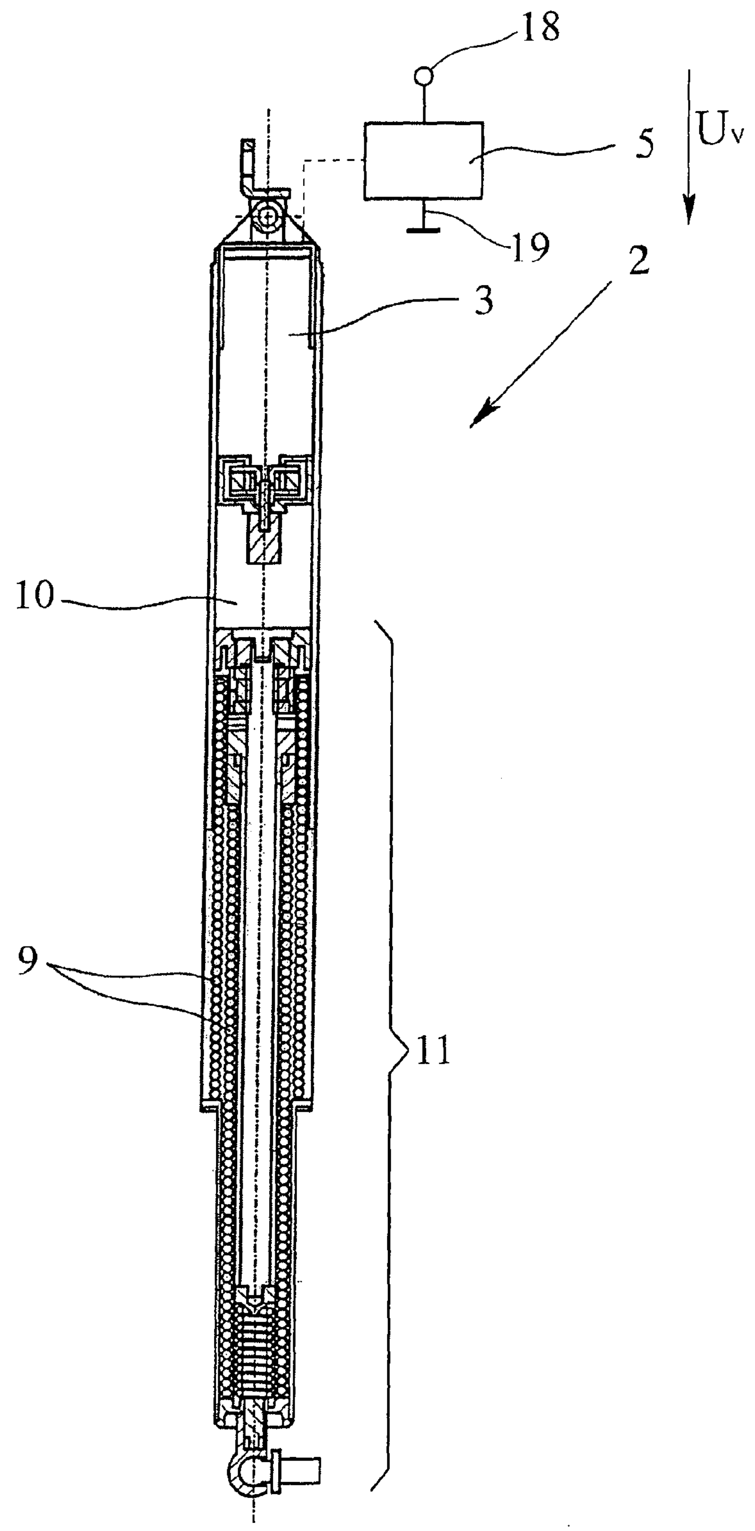
FIG. 2 shows one of the two rives of the drive configuration according to FIG. 1 in a sectional view.

The drive configuration shown in FIG. 1 is used for the motorized displacement of a hatchback 1 in a motor vehicle. However, all other displacement elements mentioned in the introductory part of the description are also advantageously applicable. All following statements on a hatchback correspondingly apply similarly for all other displacement elements mentioned therein, Two identical drives 2, which each have a drive motor 3, are associated with the drive configuration shown in FIG. 1. The drives 2 are situated in the two lateral areas of a hatchback opening 4. Only one of the two drives 2 is shown in FIG. 1, FIG. 2 shows this drive 2 in a sectional view.

The following statements only apply to the one drive 2 shown in FIG. 1. However, they apply similarly for further drives which are possibly provided.

The drive motor 3 is preferably a DC motor. However, it is also conceivable that an AC motor is used here.

The drive configuration is further equipped with a drive controller 5, which is associated with the drive 2 and is connected in a typical way to a supply voltage $U_V$. The drive controller 5 is preferably associated with both drives 2 here. It is also conceivable that a separate drive controller 5 is associated with each drive 2.

The drive configuration according to the proposal allows a manual displacement of the hatchback 1 without great design expenditure, since the drive 2 is not designed as self-locking. This means that in the case of a non-motorized displacement, i.e., a displacement of the hatchback 1 which is manual or caused by spring force or the force of gravity, the drive motor 3 also rotates and operates as it generator. Thus, the drive motor 3 generates a corresponding generator voltage $U_G$.

It is primarily essential that the drive controller is equipped with an overvoltage protector 6, which can be triggered by exceeding a limiting supply voltage $U_V$. The implementation of such an overvoltage protector 6 is known per se.

According to the proposal, however, the configuration is additionally made so that the overvoltage protector 6 can additionally be triggered by exceeding a limiting generator voltage $U_G$. The significance of the limiting generator voltage $U_G$ will be explained in greater detail hereinafter.

Primarily, the triggering of the overvoltage protector 6 causes the circuitry interruption of the drive current paths leading via the drive motor 3, in order to protect the drive motor 3 and in particular switch elements to be explained hereinafter from a possibly elevated supply voltage $U_V$. The drive current paths are current paths, via which drive power is supplied to the drive motor 3. The circuit interruption of the drive current paths occurs here via semiconductor switch elements to be explained hereinafter; however relays or the like can also be provided.

However, the fact that, in the triggered state, the overvoltage protector 6 furthermore preferably electrically couples the terminals 7, 8 of the drive motor 3 to one another, even short-circuits them here, and thus brakes the drive motor 3, is also of interest here.

The design of the drive configuration, in particular of the overvoltage protector 6, is of particular significance here. The overvoltage protector 6 is advantageously triggered by a non-motorized displacement of the hatchback 1 precisely when the displacement speed exceeds the normal operational displacement speed. The overvoltage protector 6 preferably short-circuits the terminals 7, 8 of the drive motor 3 here and thus ensures the emergency braking of the drive motor 3. However, it is also conceivable that the overvoltage protector 6 only outputs an emergency signal in the triggered state, which optionally results in counter energizing 6, or the like, of the drive motor.

The displacement speed exceeds the normal operational displacement speed, for example, if a spring configuration 9 associated with the drive 2 breaks, which would ensure the stopping of the hatchback 1 in normal operation. Such a spring configuration 9 is provided in the drive 2 shown in FIG. 2. It counteracts the weight force of the hatchback 1.

The drive 2 shown in FIG. 2 is equipped as a spindle drive having drive motor 3, intermediate gearing 10, and spindle-spindle nut gearing 11, the spring configuration 9 ensuring that the spindle-spindle nut gearing 11 is pre-tensioned in the extended position. FIG. 1 shows the installed state of the spindle drive.

The drive controller 5, which is only indicated in FIG. 2, has an H-bridge circuit 12 having two low-side switches 13, 14 and two high-side switches 15, 16 for activating the drive motor 3. The H-bridge circuit 12 is constructed in a typical way using two half-bridges 12*a*, 12*b*, which each have one of the low-side switches 13, 14 and one of the high-side switches 15, 16. The low-side switch 13, 14 and the high-side switch 15, 16 of a half-bridge 12*a*, 12*b* are connected in series with respect to their switch outputs. The terminals 7, 8 of the drive motor 3 are connected to the contact points of the respective switch pairs 13, 15; 14, 16 connected in series.

In the triggered state, the overvoltage protector 6 preferably switches through the two high-side switches 15, 16 and blocks the two low-side switches 13, 14 here. However, it is also conceivable that, vice versa, in the triggered state of the overvoltage protector 6, the two low-side switches 13, 14 are switched through and the two high-side switches 15, 16 are blocked.

In both above-mentioned cases, the drive motor 3 is short-circuited and is in braking operation.

An array of advantageous variants are conceivable for the implementation of the low-side switches 13, 14 and the high-side switches 15, 16. These switches 13, 14, 15, 16 are preferably designed as MOSFETs here, the low-side switches 13, 14 being N-channel MOSFETs and the high-side switches 15, 16 being P-channel MOSFETs. The gate terminals 13*a*, 14*a*,

15*a*, 16*a* of the switches 13, 14, 15, 16 are coupled to a logic unit 20, which is only shown in FIG. 4, to be explained hereinafter.

The configuration is made so that the generator voltage $U_G$ via the body diodes 17 of a high-side switch 15, 16 of one half-bridge 12*a*, 12*b* and one low-side switch 13, 14 of the other half-bridge 12*a*, 12*b* of the H-bridge circuit 12 is at least partially switched through to the supply terminals 18, 19 of the H-bridge circuit 12.

The existence of the body diodes 17 is inherent to MOSFET switching elements. For illustration, the body diodes 17 are shown as discrete components in FIG. 4, to be explained hereinafter.

Figure 3:
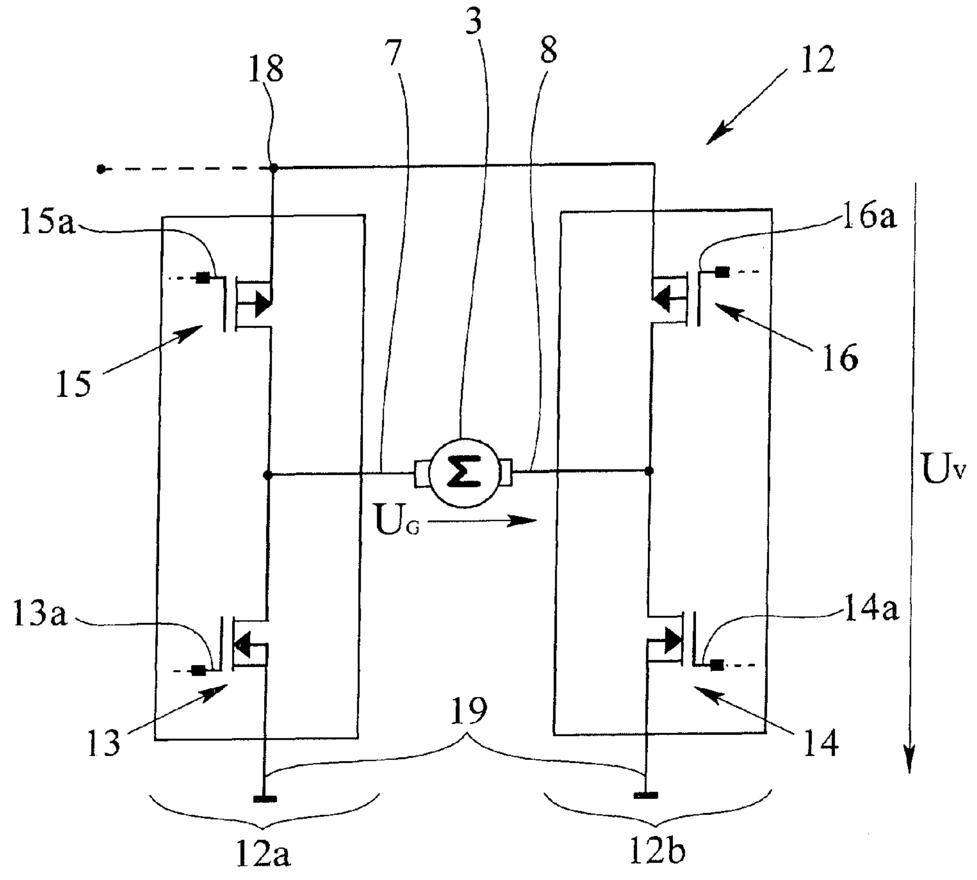
FIG. 3 shows the H-bridge circuit of the drive controller for the drive according to FIG. 2 in an entirely schematic view.

The illustration in FIG. 3 shows that the part of the generator voltage $U_G$ switched through to the supply terminals 18, 19 of the H-bridge circuit 12 can result in triggering of the overvoltage protector 6 if a limiting generator voltage is exceeded, since this corresponds to exceeding the limiting supply voltage $U_V$ with appropriate design. It is clear here that the correct design of the limiting generator voltage $U_G$ is important to be able to ensure that the overvoltage protector 6 is only triggered if the displacement speed is above the normal operational displacement speed during the non-motorized displacement of the hatchback 1.

A cost-effective implementation of the drive controller 5 according to the proposal using standard components results in that the two half-bridges 12*a*, 12*b* of the H-bridge circuit 12 are each designed as an integrated half-bridge module, and in that both half-bridge modules are each equipped with a separate overvoltage protector 6. “Integrated” means here that the half-bridge modules are integrated circuits. The fundamental construction of such a half-bridge module is shown in FIG. 4.

Figure 4:
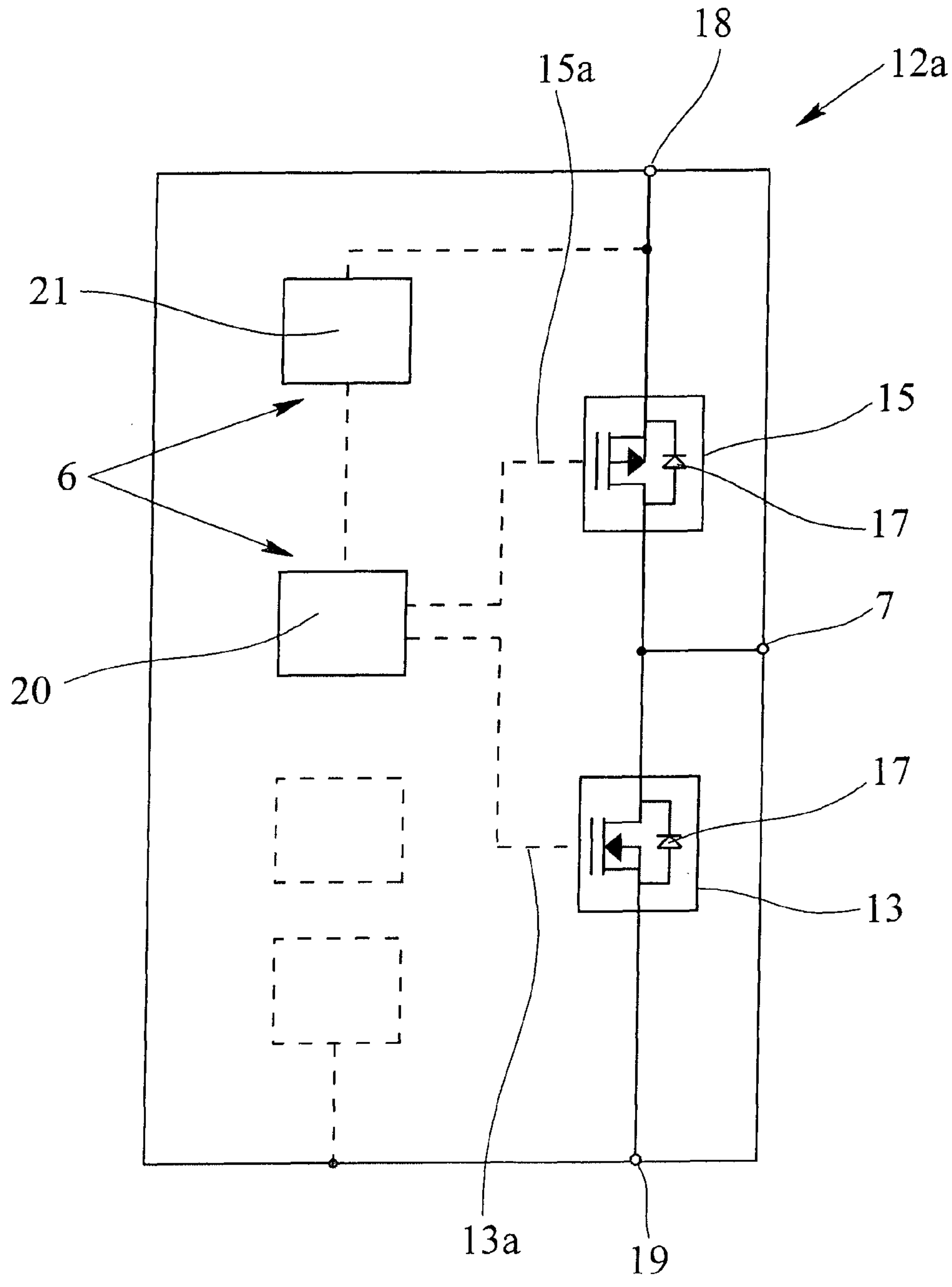
FIG. 4 shows a half-bridge module of the H-bridge circuit according to FIG. 3 as a block diagram.

The half-bridge module shown in FIG. 4 is equipped with a logic unit 20 for activating the low-side switch 13 and the high-side switch 15, The overvoltage protector 6 of the two half-bridge modules 12*a*, 12*b* has a detection unit 21 in each case, which is connected to the logic unit 20, for detecting if the supply voltage $U_V$ exceeds the limiting supply voltage.

A circuitry aspect is also of interest in the illustrated exemplary embodiment, which is thus preferred. It is provided therein that the drive motor 3 is permanently connected to the two half-bridges 12*a*, 12*b*. An ability to disconnect the drive motor 3 from the half-bridges 12*a*, 12*b* in any way is not provided. This results from the concept according to the proposal, according to which the generator voltage $U_G$ is relayed to the supply terminals 18, 19 even in the event of non-motorized displacement of the hatchback 1, as explained.

It has already been noted that two drives 2 are provided in the illustrated embodiment, which is thus preferred. The drive controller 5 has an H-bridge circuit 12 with overvoltage protector 6 in each case for activating the drive motors 3 of the two drives 2, the respective corresponding supply terminals 18, 19 of the H-bridge circuits 12 being interconnected. “Corresponding” means that the terminals 18 for the supply potential and the terminals 19 for the ground potential are each interconnected.

The advantage of the above-described interconnection of the corresponding supply terminals 18, 19 of the H-bridge circuits 12 is that the generator voltage $U_G$ of only one of the drive motors 3 is sufficient to trigger the overvoltage protector 6 of both H-bridge circuits 2. Reliable and above all rapid braking of the hatchback 1 may thus be implemented.

The two H-bridge circuits 12 are preferably, as explained above, each assembled from two half-bridge modules with overvoltage protector.

The solution according to the proposal may be applied to all possible displacement elements 1 of a motor vehicle. The displacement element 1 is preferably a hatchback, a trunk lid, an engine hood, a door, in particular a side door, or a cargo space floor of a motor vehicle.

According to a further teaching, which also has independent significance, a displacement element configuration of a motor vehicle having a displacement element 1, in particular a hatchback 1, and having an above-described drive configuration according to the proposal for the motorized displacement of the displacement element 1 is claimed. Reference can be made to the above statements on the drive configuration according to the proposal in their entirety.

In a particularly preferred embodiment, the configuration is made as already discussed above, so that the overvoltage protector 6 only triggers if the non-motorized displacement of the displacement element 1 occurs above the normal operational displacement speed.

Furthermore, the displacement element 1 is preferably automatically displaceable by weight and/or spring force, the configuration being made so that the overvoltage protector 6 can be triggered by the automatic displacement and by the generator voltage $U_G$ generated by the drive motor 3. This means that the limiting generator voltage $U_G$ is selected in particular so that the limiting generator voltage $U_G$ can be cancelled out during an automatic displacement of the displacement element 1, for example, if the displacement element particular the hatchback 1, is closing.

Using the two above-explained independent teachings, manual and/or automatic displacement of the displacement element 1 at excessive speed is braked in a conceivably simple way. The expenditure for circuitry and software is minimal due to the above dual usage of the overvoltage protector 6. The fact that the braking operation according to the proposal is fully functional even if the drive controller 5 is unpowered or inactive is to be emphasized.

What is claimed is:

1. A drive configuration for the motorized displacement of a displacement element of a motor vehicle, at least one drive having an electrical drive motor, and a drive controller, which is associated with the drive and connected to a supply voltage at a first supply terminal and a second supply terminal, wherein the first supply terminal is connected to a supply potential and the second supply terminal is connected to a ground potential, the drive not being designed as self-locking, so that in the case of a non-motorized displacement of the displacement element, the drive motor operates as a generator and generates a generator voltage, wherein the drive controller is equipped with an overvoltage protector, which can be triggered by exceeding a limiting supply voltage across the first supply terminal and the second supply terminal, and the configuration is further made so that the overvoltage protector can additionally be triggered by a non-motorized displacement of the displacement element if a limiting generator voltage is exceeded, wherein two drives are provided, and the drive controller for activating the drive motors of the drives has an H-bridge circuit with overvoltage protector in each case, and the respective corresponding supply terminals of the H-bridge circuits are interconnected.

2. The drive configuration according to claim 1, wherein the overvoltage protector interrupts the drive current paths leading via the drive motor via circuitry in the triggered state.

3. The drive configuration according to claim 1, wherein the overvoltage protector electrically couples the terminals of the drive motor to one another to short circuit them in the triggered state, and thus brakes the drive motor.

4. The drive configuration according to claim 1, wherein the configuration is made so that the overvoltage protector can only be triggered by a non-motorized displacement of the displacement element if the displacement speed is above the normal operational displacement speed.

5. The drive configuration according to claim 1, wherein the drive controller has an H-bridge circuit having two low-side switches and two high-side switches for activating the drive motor, and the H-bridge circuit.

6. The drive configuration according to claim 5, wherein the overvoltage protector switches through the two high-side switches and blocks the two low-side switches in the triggered state, or the overvoltage protector switches through the two low-side switches and blocks the two high-side switches in the triggered state.

7. The drive configuration according to claim 6, wherein the low-side switches and the high-side switches are designed as MOSFETs, and the configuration is made so that the generator voltage via the body diodes of one high-side switch of one half-bridge and one low-side switch of the other half-bridge of the H-bridge circuit is at least partially switched through to the supply terminals of the H-bridge circuit.

8. The drive configuration according to claim 1, wherein the part of the generator voltage switched through to the supply terminals results in triggering of the overvoltage protector if it exceeds a limiting generator voltage.

9. The drive configuration according to claim 5, wherein the two half-bridges of the H-bridge circuit are each designed as an integrated half-bridge module, and both half-bridge modules are each equipped with a separate overvoltage protector.

10. The drive configuration according to claim 1, wherein the displacement element is designed as a hatchback, a trunk lid, an engine hood, a door, or as a cargo space floor of the motor vehicle.

11. A displacement element configuration of a motor vehicle having a displacement element, and having a drive configuration for the motorized displacement of the displacement element according to claim 1.

12. The displacement element configuration according to claim 11, wherein the configuration is made so that the overvoltage protector can only be triggered by a non-motorized displacement of the displacement element if the displacement speed is above the normal operational displacement speed.

13. The displacement element configuration according to claim 11, wherein the displacement element is automatically displaceable by weight and/or spring force, and the configuration is made so that the overvoltage protector can be triggered by the automatic displacement and by the generator voltage which is generated by the drive motor.

14. The drive configuration according to claim 1, wherein the electrical drive motor is a DC motor.

15. The drive configuration of claim 3, wherein the overvoltage protector short circuit the drive motor.

16. The drive configuration of claim 5, wherein the H-bridge circuit has two half-bridges, each of which has one of the low-side switches and one of the high-side switches.

17. The drive configuration of claim 9, wherein the two half-bridge modules each have one logic unit for activating the low-side switch and the high-side switch.

18. The drive configuration of claim 9, wherein the overvoltage protector of the two half-bridge modules has a detection unit in each case, which is connected to the logic unit, for detecting if the supply voltage exceeds the limiting supply voltage.

19. The drive configuration of claim 11, wherein the displacement element is a hatchback.

* * * * *